Feb. 12, 1957  A. G. SLEE ET AL  2,781,114
BRAKING SYSTEMS FOR VEHICLES
Filed April 12 1954
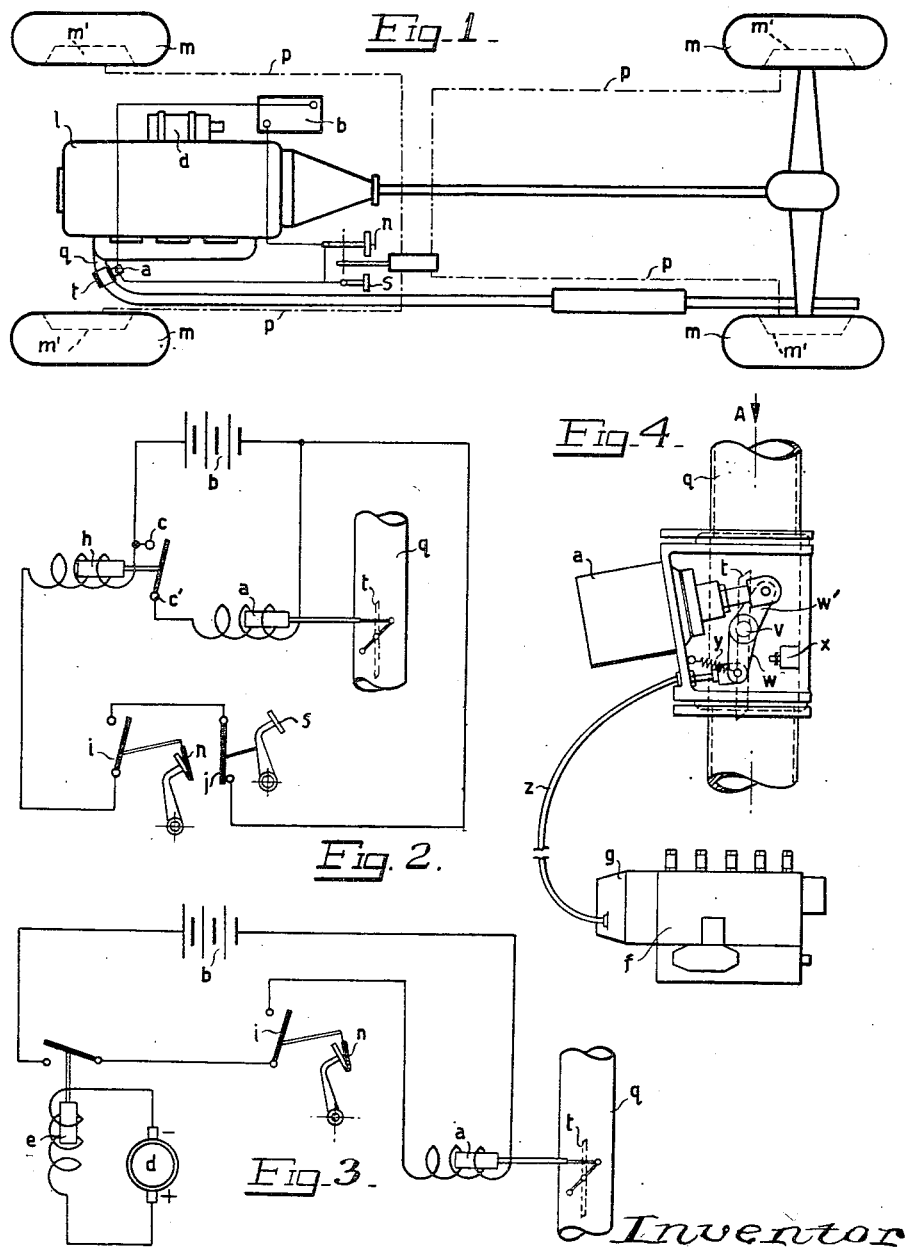

United States Patent Office 2,781,114
Patented Feb. 12, 1957

2,781,114

BRAKING SYSTEMS FOR VEHICLES

Alfred Graham Slee, Cardiff, and William Kenneth Cox, Porth, Wales, assignors to The British Electric Traction Company Limited, London, England and Thomas Ash & Company Limited, Birmingham, England Application April 12, 1954, Serial No. 422,607

Claims priority, application Great Britain May 15, 1953

9 Claims. (Cl. 192—.058)

This invention relates to braking systems for vehicles of the kind in which a valve is provided in the exhaust conduit of an internal combustion engine which when closed cuts off or restricts the outlet of gases from the engine so that the latter whilst in driving connection with the road wheels acts as a powerful brake, thus relieving the normal wheel brakes of a substantial part of the work involved in retarding the vehicle and reducing the tendency for skids.

An object of the present invention is to provide improved or simplified systems of this kind.

The invention consists in a braking system of the kind set forth having features as set forth in the claims appended hereto.

Two examples of braking systems according to the present invention will now be described with reference to the accompanying drawings, in which:

Figure 1 shows diagrammatically some of the component parts of a vehicle embodying an exhaust brake according to the invention;

Figure 2 is a circuit showing the electrical connections of one form of brake;

Figure 3 is a circuit diagram of a form embodying certain modifications;

Figure 4 is an enlarged section of the butterfly valve on the exhaust conduit.

Referring to Figure 1, a motor vehicle having an internal combustion engine $l$ and wheels $m$ is provided with the usual brake pedal $n$ actuating friction brakes $m'$ on the four wheels $m$, for example through a system of hydraulic pipes $p$ in a well-known manner. The exhaust gases from the engine $l$ pass through an exhaust conduit $q$. There is the usual battery $b$, and a clutch pedal is shown at $s$ for actuating switch $j$. A butterfly valve $t$, shown in greater detail in Figure 4, is mounted in the exhaust conduit $q$ and designed to be closed by a solenoid $a$.

It will be understood that the effect of the valve $t$ is to obstruct the escape of the exhaust gases and turn the engine into a compressor to produce a powerful braking effect on the wheels via the vehicle transmission, in a manner which is in itself well-known.

The electrical circuit for energising the solenoid $a$ is shown in Figure 2. It is connected to the battery $b$ through a pair of relay contacts $c\ c'$, which are arranged to be closed by a solenoid $h$, connected to the battery $b$ through a switch $i$ mounted on the brake pedal $n$. When pressure is applied to the brake pedal $n$, and before the friction brakes on the wheels $m$ are operated, the switch $i$ closes to energise solenoid $h$, which closes contacts $c\ c'$ to allow current to flow from battery $b$ through solenoid $a$, and close the valve $t$ in the exhaust conduit $q$ to give a powerful braking effect.

In the modified circuit of Figure 3 is shown a solenoid switch $e$ operated by the dynamo $d$ of the vehicle. The circuit is also modified in that the relay $h$ is omitted and the brake pedal switch $i$ is directly connected in the circuit from the battery $b$ to the exhaust valve solenoid $a$. When the engine speed is above a predetermined magnitude the voltage generated by the dynamo is sufficient to hold the switch $e$ closed and the exhaust brake can be operated on closure of the switch $i$, but when the engine speed falls below this magnitude the switch $e$ opens, breaking the circuit and rendering the exhaust brake inoperative. This prevents the engine from stalling when the vehicle comes to rest.

When the present invention is applied in conjunction with compression-ignition engines which are fitted with vacuum controlled governed fuel injection pumps, means have to be adopted to hold back the fuel pump rack in the "off fuel" position when the brake is in operation. This may be achieved by the arrangement shown diagrammatically in Figure 4, in which the fuel injection pump is shown at $f$.

The butterfly valve $t$ in exhaust conduit $q$ is pivoted so that, when the valve is closed, the exhaust gas pressure acts on a greater area of the valve in a direction tending to open it than in the other direction. Arrow A shows the direction of flow of the gas.

The offset spindle $v$ of valve $t$ carries a two-armed lever, of which one arm $w$ engages an adjustable stop $x$, and the other arm $w'$ is connected to the plunger of solenoid $a$. Arm $w$ is also connected to a light spring $y$ tending to open valve $t$. In order to prevent the engine from stalling as the vehicle is brought to rest, the stop $x$ may be set to prevent complete closure of the valve.

A cable control $z$ connected at one end to the arm $w'$ of the two-armed lever actuates a plunger (not shown) on the fuel rack adjustment housing $g$ of the pump $f$. By this means, when the exhaust brake is in operation, the plunger holds the fuel pump rack in the "off fuel" position, and when the brake is released the rack resumes its normal travel.

We claim:

1. In a motor vehicle having wheels, an internal combustion engine, a driving connection between said engine and at least some of the wheels, a foot brake pedal, friction braking means on at least some of the wheels and operable by said foot brake pedal, an exhaust conduit receiving the exhaust gases from said engine, a butterfly valve in said exhaust conduit, solenoid means adapted on energization thereof to close said butterfly valve, a battery, an electric relay, an electric switch operable by said foot brake pedal prior to actuation of said friction braking means, said electric switch being adapted to complete an electrical circuit between said battery and said relay, and said relay being adapted to complete an electrical circuit between said battery and said solenoid.

2. In a motor vehicle having wheels and driven by an internal-combustion engine having an exhaust system, friction brakes on said wheels, a foot brake pedal adapted to actuate said friction brakes, a clutch pedal adapted to disengage the engine from the wheels, a butterfly valve in said exhaust system, solenoid means adapted to close said butterfly valve, spring means urging said butterfly valve towards the open position, an electric battery, a first electric switch operable by said foot brake pedal, a second electric switch operable by said clutch pedal, said first switch being adapted on operation of said brake pedal to complete a circuit between said battery and solenoid means, and said second switch being adapted to cause interruption of said circuit.

3. In a motor vehicle having wheels, an internal combustion engine, a driving connection between said engine and at least some of said wheels, a foot brake pedal, friction braking means on said wheels operable by said foot brake pedal, an exhaust conduit on said engine, a spindle in said conduit carrying a butterfly valve angularly movable about said spindle to obstruct said conduit, said butterfly valve having a greater area on that side of said spindle whereby the pressure of the exhaust gases tend to open said valve than on the other side, solenoid means actuating said valve to close it, spring means urging said valve towards the open position, a battery, an electric switch operable by said foot brake pedal prior to actuation of said friction braking means, said electric switch operating to close an electric circuit between said battery and said solenoid means.

4. In a motor vehicle having wheels driven by an internal combustion engine equipped with an exhaust system and a battery, and having a foot pedal operating wheel brakes, additional braking means comprising a butterfly valve in said exhaust system adapted to be closed electrically by a solenoid, said solenoid being energised from said battery by a switch operated by said foot pedal prior to actuation of said wheel brakes.

5. The combination as recited in claim 4 including a further switch adapted to be opened by operation of said clutch pedal in a sense disengaging said engine, said further switch being electrically connected between said foot-pedal-operated switch and said solenoid.

6. The combination as recited in claim 4 including a further switch electrically connected between said foot-pedal-operated switch and said solenoid, a dynamo driven at a speed proportional to the speed of said engine, and a relay coil, said relay coil being electrically connected to the output of said dynamo, and being adapted to hold said further switch closed only when the voltage generated by said dynamo exceeds a predetermined magnitude.

7. The combination as recited in claim 4 including means operable by said solenoid simultaneously with said valve, for holding said fuel pump in the "off fuel" position.

8. In a motor vehicle having wheels, an internal combustion engine, a driving connection between said engine and at least some of said wheels, a brake pedal, friction braking means operable by said pedal, a first electric switch on said pedal, a dynamo driven by said engine at a speed proportional to engine speed, a second switch, a relay coil controlling said second switch, an electrical circuit joining said relay coil to said dynamo, an exhaust pipe adapted to receive exhaust gases from said engine, a butterfly valve in said exhaust pipe, electric solenoid means adapted to close said valve, a source of electrical power, and an electric circuit joining said solenoid means to said source of power through said first and second switches.

9. In a motor vehicle as specified in claim 8, an adjustable fuel injection pump on said engine, and means operable by said solenoid for holding said fuel pump in the "off fuel" position.

References Cited in the file of this patent

UNITED STATES PATENTS

| | | |
|---|---|---|
| 1,883,686 | Geiger | Oct. 18, 1932 |
| 2,168,232 | Messinger | Aug. 1, 1939 |
| 2,216,138 | Sellers | Oct. 1, 1940 |
| 2,471,690 | Howland | May 31, 1949 |